United States Patent
Prinstil et al.

(10) Patent No.: US 10,938,237 B2
(45) Date of Patent: Mar. 2, 2021

(54) DIRECT CONNECT HOMEGRID SYSTEM FOR DC POWER DISTRIBUTION

(71) Applicants: Ambroise Prinstil, East Hartford, CT (US); Timothy Andrew Gallagher, Canton, CT (US)

(72) Inventors: Ambroise Prinstil, East Hartford, CT (US); Timothy Andrew Gallagher, Canton, CT (US)

( * ) Notice: Subject to any disclaimer, the term of this patent is extended or adjusted under 35 U.S.C. 154(b) by 168 days.

(21) Appl. No.: 16/431,120

(22) Filed: Jun. 4, 2019

(65) Prior Publication Data
US 2020/0303951 A1 Sep. 24, 2020

Related U.S. Application Data

(60) Provisional application No. 62/820,434, filed on Mar. 19, 2019.

(51) Int. Cl.
| | |
|---|---|
| *H02J 13/00* | (2006.01) |
| *H02J 3/38* | (2006.01) |
| *H01R 25/00* | (2006.01) |
| *H01M 16/00* | (2006.01) |
| *H02J 3/32* | (2006.01) |
| *G05B 15/02* | (2006.01) |
| *H01M 10/46* | (2006.01) |
| *H01R 33/94* | (2006.01) |

(52) U.S. Cl.
CPC .......... *H02J 13/0096* (2013.01); *G05B 15/02* (2013.01); *H01M 10/46* (2013.01); *H01M 16/006* (2013.01); *H01R 25/006* (2013.01); *H01R 33/94* (2013.01); *H02J 3/32* (2013.01); *H02J 3/382* (2013.01); *H02J 3/383* (2013.01); *H02J 3/387* (2013.01); *H01M 2220/10* (2013.01); *H02J 3/388* (2020.01)

(58) Field of Classification Search
CPC .......... H02J 13/0096; H02J 3/32; H02J 3/382; H02J 3/383; H02J 3/387; H02J 3/388; G05B 15/02; H01M 10/46; H01M 16/006; H01M 2220/10; H01R 25/006; H01R 33/94
See application file for complete search history.

(56) References Cited

U.S. PATENT DOCUMENTS 10,243,368 B2 3/2019 Prinstil et al.

*Primary Examiner* — Robert L Deberadinis

(57) ABSTRACT

A Direct Connect Homegrid (DC-Homegrid) system for Direct Current (DC) power control and delivery into a structure by way of Unifying Electrical Interface (UEI) platforms is here presented. By means of the Homegrid, multiple self-contained approaches are introduced to keep a structure powered with DC, either as a substitute or as a supplement to the conventional Alternating Current (AC) source. By the illustrated approaches contained herein, a new methodology permitting to retain power operation in the occurrence of a blackout, due to natural disaster, cyber-attack or any other conventional AC grid failure, is revealed. Such DC-Homegrid is envisioned to become the precursor in establishing the DC infrastructure of the future. The embodiments presented in this patent illustrate alternate methods for achieving power independence while increasing the value for adoption of renewable and sustainable energy.

23 Claims, 12 Drawing Sheets

| UEI MODE KEY E=TOP F=BOT (EF) | UEI FEATURE KEY DCBA (Front View) | MODE | DESCRIPTION | CARTRIDGE FEATURE KEY ABCD (Back View) | CARTRIDGE MODE KEY E=TOP F=BOT (EF) |
|---|---|---|---|---|---|
| 10 | 0001 | DELTA | ½ SYSTEM VOLTAGE (Limited) | 1000 | 10 |
| 10 | 0010 | DELTA | SYSTEM VOLTAGE (Limited) | 0100 | 10 |
| 10 | 0011 | DELTA | 3-PHASE / SYSTEM VOLTAGE / ½ SYSTEM VOLTAGE / HIGH LEG | 1100 | CART-DEP |
| 11 | 0101 | DELTA | LOW HYBRID DELTA AC 125V / DC 24V | 1010 | CART-DEP |
| 11 | 0110 | DELTA | MID HYBRID DELTA AC 250V / DC 96V | 0110 | CART-DEP |
| 01 | 0001 | WYE | PHASE VOLTAGE | 1000 | 01 |
| 01 | 0010 | WYE | SYSTEM VOLTAGE (PHASE V. *√3) | 0100 | 01 |
| 01 | 0011 | WYE | 3-PHASE / PHASE VOLTAGE / SYSTEM VOLTAGE (PHASE V. * √3) | 1100 | CART-DEP |
| 11 | 0101 | WYE | LOW HYBRID WYE AC PHASE V. / DC 24V | 1010 | CART-DEP |
| 11 | 0110 | WYE | MID HYBRID WYE AC SYSTEM V. / DC 96V | 0110 | CART-DEP |
| 11 | 0100 | DC-300/96/24V | DC 300/96/24 VOLTS (Full) | 0010 | CART-DEP |
| 01 | 0100 | LOW DC-24V | DC 24 VOLTS (Limited Low) | 0010 | 01 |
| 10 | 0100 | MID DC-96V | DC 96 VOLTS (Limited Mid) | 0010 | 10 |
| 00 | 0100 | DC-300/500V | HI-DC 300/500 VOLTS (High capacity equipment/Level 3 EV Charging) | 0010 | 00 |
| 00 | 1000 | SWITCHES | DC SWITCHES | 0001 | 00 |
| 01 | 1000 | SWITCHES | SWITCHES REGULAR SINGLE | 0001 | 01 |
| 10 | 1000 | SWITCHES | SWITCHES 3-WAY | 0001 | 10 |
| 11 | 1000 | SWITCHES | SWITCHES 4-WAY / DOUBLE GANG REGULAR | 0001 | 11 |
| 00 | 1001 | SPECIAL-AC | AC POWERED SPECIAL FUNCTION | 1001 | 00 |
| 00 | 1100 | SPECIAL-DC | DC POWERED SPECIAL FUNCTION | 0011 | 00 |
| 10 | 0000 | LIGHTS-AC | AC POWERED LIGHTS | 0000 | 10 |
| 01 | 0000 | LIGHTS-DC | DC POWERED LIGHTS | 0000 | 01 |
| 11 | 0000 | DATA | DATA | 0000 | 11 |

UEI 0 = CLOSED CAVITY  
UEI 1 = OPEN CAVITY  
CARTRIDGES: 0 = NO PEG  
CARTRIDGES: 1 = PEGGED  
CART-DEP = CARTRIDGE DEPENDENT

TABLE 1

FIG. 12

DIRECT CONNECT HOMEGRID SYSTEM FOR DC POWER DISTRIBUTION

PRIORITY CLAIM

The application described within claims the benefit of U.S. Provisional Patent Application Ser. No. 62/820,434, filed Mar. 19, 2019, which application is hereby incorporated by reference.

FIELD OF THE INVENTION

The present invention discloses a Direct Connect Homegrid power delivery system (DC-Homegrid) intended to facilitate Direct Current (DC) power distribution in a building making use of a Unifying Electrical Interface connection platform based system.

BACKGROUND OF INVENTION

With the introduction of the Unifying Electrical Interface (UEI) connection platform, now U.S. Pat. No. 10,243,368, here incorporated by reference, came the opportunity to introduce a complementary system intended for taking full advantage of that platform. The UEI platform offers the ease of delivering a multiplicity of power options, AC and/or DC, into a building. As such, the end user will gain access to a broader supply capability herein. The world over, the standard is fully developed for AC power delivery. However, DC still requires new standards to be developed to take full advantage of the multiple delivery options made available for the end power consumer to use.

This patent seeks to introduce a new "Direct Connect" power system for various modes of DC power delivery. With this new invention, a worldwide unifying standard for DC is provided upon which countries can agree to eliminate the confusion that presently exists with AC as each country has adopted its own standard.

A disadvantage associated with the use of AC power grid has to do with long range transmission. This has become an element of concern and fear that many have of the disastrous effects of a natural disaster or criminal attacks on the power grid itself. As a remedy for that possibility, this patent seeks to present a broader usage of the alternate method by making use of a home base power generation presented in the UEI patent. Power produced in nearby locations such as rooftop solar panels, a fuel cell micro power-plant, a geothermal farm and any other renewable and/or sustainable method of energy generation can, by means of the UEI system, form an isolated Direct Connect—DC-Homegrid. Each house or building would thereby take advantage of its own DC power generation in complete isolation from the current AC power grid.

As it is well known in the electricity industry, most equipment in use today does ultimately use electricity after it has been converted from AC to DC. Another aim of this patent is to expand the use of the UEI's delivery path for DC to make direct use of power either stored or generated from any of the renewable energy technology methods, whose output is DC. This approach will obviate the need for the back and forth conversion presently being done to bring DC to most equipment in use. One major challenge associated with inverting all DC generation into AC is the fact that most of the renewable power generated is then transferred to the AC grid. This is done because the current infrastructure is setup to work only with AC. That limitation leaves the power consumer vulnerable and in the dark if anything happens to the AC power grid. Furthermore, use of DC in a building does offer the added advantage of having an alternate power stream that is isolated from the AC power grid. This can be compared to the hot and cold-water lines implemented in the home and the benefits that have been derived. Separating the AC path from that of the DC allows the end power user, by way of the UEI platform, to retain a measure of power functionality in the event of a natural disaster or a criminal attack (cyber-attack) on the AC power grid.

Most small devices currently in use have a constant need to be recharged. As a result, they all have an underlying need of a DC charger to operate. The existing standard in place requires the conversion of AC into DC. By way of the proposed DC-Homegrid, the ability is created to have different levels of DC voltage and power levels sent directly to a cartridge, and from there the equipment making use of that DC power can have a simple regulation circuit to facilitate making use of the DC, removing the need of bulky power supplies.

Due to the increase in electrical energy demands, many countries are promoting the use of renewable power generation to help offset the carbon footprint associated with conventional electricity generation, which often uses fossil-based fuel in their energy production. Renewable energy's technological advances have facilitated the use of modern-day technologies in even some of the most remote rural and underdeveloped places on earth. Solar based energy generation, for this reason, has seen a dramatic increase in popularity. Many residential and industrial companies have invested in their own solar power generation to, among other benefits, help reduce cost and dependence or reliance solely on electric utility companies for their electrical power. For the purpose of this patent, we are going to look at it from the perspective of integrating this DC-Homegrid in conjunction with the UEI technology to offer an avenue for renewable energy providers to bypass the need to tie all of the generated power to the AC grid before making use of it by offering an avenue and a method for connecting to DC directly.

Photovoltaic energy generation, which is one the most widely utilized alternative energy technologies used for power generation, produces a DC voltage. Meanwhile, due to the adopted conventions, before its use, that voltage needs to be converted from DC to AC by means of power inverter units. That conversion takes place even in the case where the generated power is stored in large batteries prior to being used. Most equipment in use, even when there is an AC plug coming directly from it, does have an internal power supply that converts the AC voltage back into DC. One of the many aims of this patent is to offer avenues and means of taking advantage of the generated power without having to go through the many inversion and conversion processes.

SUMMARY OF INVENTION

The Unifying Electrical Interface platform has a series of isolated and dedicated connection chambers forming a receptacle that can be wired in various modes to make it possible to get more than a singular supply from one access point. Most houses up until now have their infrastructure already built within the constraints of the preceding AC platform. To take advantage of the functionality and features already enumerated permitting to bypass the problems of the AC-only power delivery standard, it is nonetheless possible to upgrade or install in a newly wired system to take advantage of the features and functions made available by this proposed DC-Homegrid system.

By means of the UEI versatility and ability to allow more than a singular form of power to be delivered via a single port, the capability to have a hybrid port providing either a single AC voltage or a single DC voltage, or even a combination thereof becomes possible.

In the case of DC use, locations such as bedrooms, family rooms and offices—areas where many adapters/chargers are often used—having DC connectivity in place can facilitate connecting directly into the DC supply, if available, to charge or operate devices. A combination AC/DC hybrid outlet will offer even greater options and flexibility to the consumer. DC powered audio devices will have many advantages over the AC powered units. Benefits include size and weight reduction, minimizing heat generation, cost of manufacturing, potentially reduced consumer costs; and best of all, a cleaner sounding audio system at a lower cost per unit.

With the Unifying Electrical Interface platform in place, all that is needed to implement the DC-Homegrid system is to have the DC-Homegrid power generation system available in the home and wired to the UEI ports to take advantage of the connectivity in place. The internal connection of the outlets and their active connection prongs will determine which of the voltages available at the UEI base will be made available to the consumer.

When properly implemented, the use of the UEI platform offers the benefit of not having a charger/transformer connected to the AC line which continuously consumes electricity, even when not in use, that waste is thereby eliminated. DC coming either directly from a source such as a solar power generation system, battery storage or simply from any DC supply source such as a gasoline, propane or natural gas generator, can thus be provided at the UEI base. The DC-Homegrid system having a central DC source selector will work to make DC available, either from a pure DC source such as a battery or generated by means of a renewable or sustainable mode of power generation, to the consumer.

In the quest for energy independence, many sought to invest into alternative energy technologies. This approach, however, used with the current infrastructure does not offer the ability to directly utilize the energy generated, which often is in the form of DC without first inverting it into AC. This is due to the lack of infrastructure and technology in place to take advantage of DC directly. By way of the UEI, the DC-Homegrid system makes it possible to have DC brought in directly to some outlet ports. As such, the limitation of having an AC-only powered home or building is precluded. The ability to have DC at the outlets does not eliminate the choice of inverting the major portion of the daily generated DC into AC to place it back onto the power grid in order to buy it back at nightfall.

In the case where the residence is located in a remote or rural location, the energy generated during the course of a given day cannot all be used at the time of generation. Or in the case where there is no power grid to transfer the power available for reclaiming at a later time, it is of great benefit to invest in a battery storage system. Battery technologies have also seen great improvements over the years. When they are approved and readily made available to the general public, the consumer will have a broader choice to use AC and DC independently from having external power brought into the building, thereby becoming fully independent.

Having the availability of battery storage working in conjunction with the UEI helps the user maintain power when they might otherwise be without. The Direct Connect Homegrid system in conjunction with the UEI platform provides a path for the generated DC energy to be used without having to invert it into AC first. When the house is connected to the power grid and all excess energy generation was placed onto the grid, AC power generation is interrupted to prevent the line from remaining active and becomes a safety hazard to a repair crew when repairs are needed. Although that safety system should and will remain, in the case where the UEI is used, the home does not go completely without power because of the isolated DC-Homegrid system remaining active when such repairs to the grid are needed.

Foremost is the ability of the DC-Homegrid system to keep the consumer powered if anything happens to the AC grid. That ability is useful for the homeowner in the event of a natural disaster. An independent DC path will keep a great percentage of the equipment in the home functional. The isolation provided with the UEI ensures that the DC power is safe and completely isolated from the AC side, thereby safeguarding the utility company crew repairing the line. In remote regions where there is no conventional AC power grid to be connected to, the home can be a simple DC operated home bypassing all of the inversion and conversion processes and the loss associated with them.

BRIEF DESCRIPTION OF THE DRAWINGS

In FIG. 12 is a table matrix of the many combinations that a UEI connected to a DC-Homegrid or a conventional power source can take. To prevent cross-insertion of cartridges to bases for which they are not intended, the keys found on that table show the prevention technique used.

DETAILED DESCRIPTION OF PREFERRED EMBODIMENTS

While connectivity to a power source may take many forms, the adaptations found in this invention may be construed as one of many embodiments intended for the Direct Connect Homegrid system. Many similar approaches may be derived from this that will not be covered in this application but will, regardless, represent the intent of this patent to illustrate a DC-Homegrid power system necessary to form a DC infrastructure to deliver DC power into the home, building or any place utilizing electricity. The elements to be described in this preferred embodiment will, when taken together, be found to be essential to explain the intent of the DC-Homegrid system.

At the heart of this system is the Unifying Electrical Interface (UEI) 10. It is a platform that takes the shape of a multi-channel outlet that provides pathways to either a single mode power connectivity or a combination thereof. Instead of being a singular source of power, it allows the choice for a wider selection of voltages and types; thus, its adoption for the Direct Connect Homegrid, enabling direct current DC power to be delivered into a building.

Figure 1:
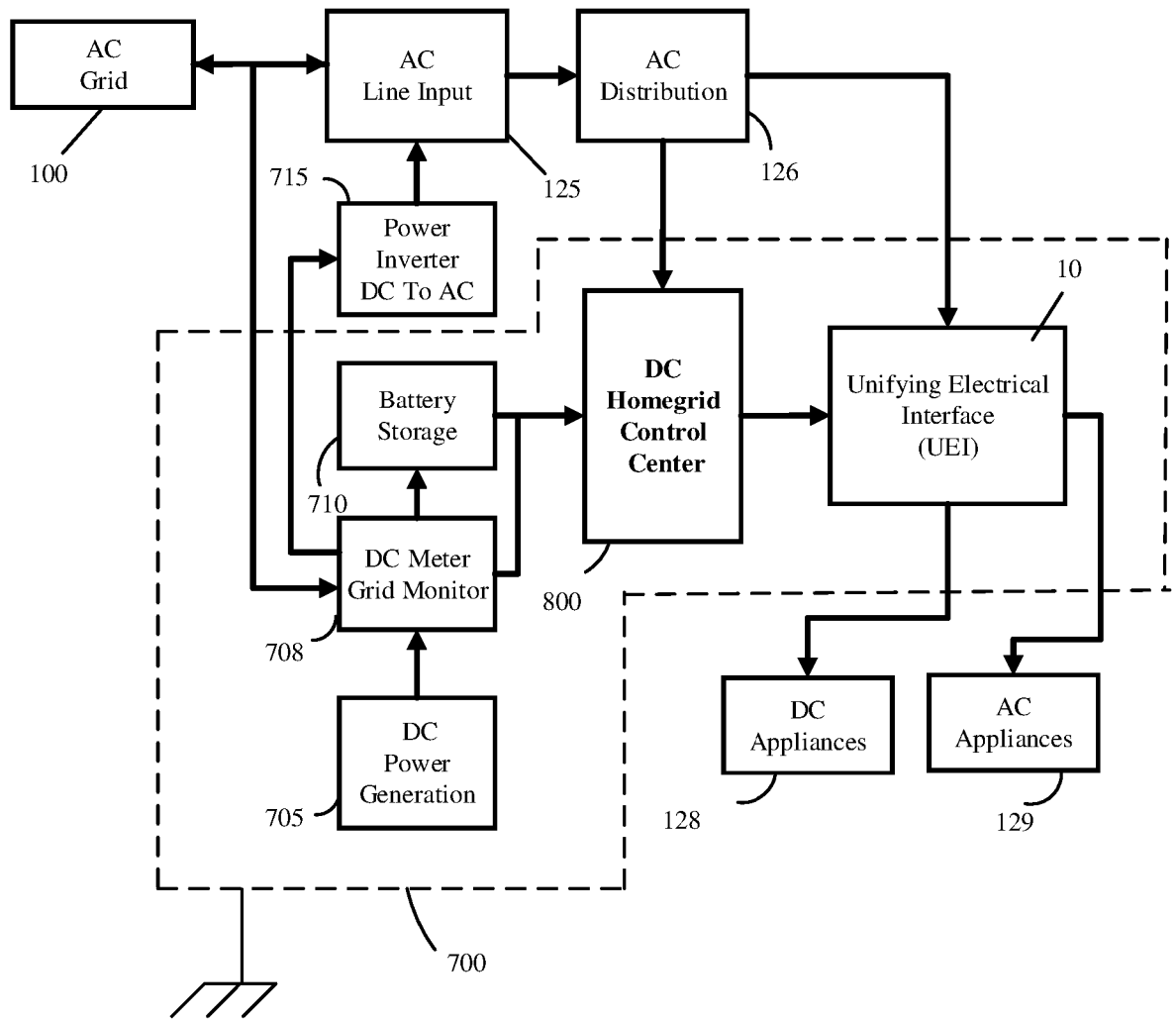
FIG. 1 is the basic block diagram representation of the Direct Connect Homegrid system (DC-Homegrid).

As illustrated in FIG. 1, the DC-Homegrid 700, made of many essential segments, forms the main element of this system. Through it is channeled electricity in the form of DC to be delivered into a building that is equipped with a UEI based platform. In the block diagram, the system is comprised of a DC power generations system 705, which could be in the form of a solar panel, a fuel cell micro power-plant, a geothermal power farm or any other form of renewable and sustainable energy generation method. That power is then fed into a DC meter 708 doubled as AC Grid monitor where the generated power is metered prior to being used. Next in the path could be a battery storage unit 710, if available, or the power could be sent directly to a power inverter unit 715. From the inverter stage, the customary method of making use of DC generated power is to invert all of the energy into AC, to be used by way of the AC infrastructure currently in existence. With this proposed Direct Connect Homegrid approach (DC-Homegrid) we are putting forward an alternate path to make use of some of the generated electricity to be used directly without first inverting it into another power format; thus the name Direct Connect.

Next in the customary path is the AC line input 125, where all of the inverted power was once channeled prior to being used in the home. If the building is connected to the AC power grid 100, the excess power generation can be placed into the grid for buyback at nightfall or when the electricity generation is hindered. From that point, AC power is also sent into the building to an AC distribution unit 126 to be distributed to its respective lighting, outlets and equipment. For the purpose of this patent, we are going to show the mode of delivery to be the UEI base 10 where it can be channeled to the desired destination and the many advantages that can be derived from its use.

Out from the meter/monitor 708 and the battery storage 710, two paths are created to feed the DC-Homegrid control center 800. The first path is a DC output where some of the energy can be sent directly to the control center prior to being inverted into AC. As is represented, there is also an alternate path where DC can be sent to the control center from battery storage 710 without being sent to the inverter unit 715. In this preferred embodiment, for the purpose of maintaining a DC based application only, DC power from the battery storage is not sent to the inverter. This is recommended for the purpose of having a lasting storage capacity by avoiding all inversion into AC with all of the waste associated with that conversion process.

A sensed DC input circuit (not shown) at the base of the DC-Homegrid Control Center 800 processes the power it receives to a regulation circuit where different levels of DC are derived and used according to the consumer's need. After regulation, the obtained DC level is sent to their respective port of a UEI base 10 where connection with a DC cartridge can make the voltage available to the end power user. It could also be sent to a UEI intended for switching where DC power to appliances could be controlled.

A third path feeding the DC-Homegrid control center comes from the AC distribution panel. From there the alternate power generation system previously introduced and referenced in the UEI patent is used. From that path DC is produced with AC in the absence of a renewable power source. The objective, in this case, is to keep the DC ports energized for direct DC usage instead of having multiple wall chargers producing DC in various locations. This single DC generation point approach renders the DC-Homegrid system very versatile and useful as an energy conservation process. This approach also helps negate the need of having multiple DC creation points throughout the home.

In the conventional way of using locally generated electricity, all of the power production, in the form of DC, is sent to an inverter to be converted into AC. This is represented in FIG. 1 as the meter/monitor circuit feeds the power inverter 715, which later is distributed to the AC line input 125 to satisfy the present power distribution infrastructure.

The grid monitor, at very short predetermined sequences, temporarily stops DC from going to the inverter so that it can monitor the presence of AC coming from the power grid. If the latter is present, the circuit reopens to keep the DC flowing back to the inverter for continuous AC production. In the event that the grid power is found to be absent, the monitor circuit retains the DC from reaching the inverter. In so doing, the local DC generation system is not suspended, it remains active and continues to produce power to be used in the form of DC in the building.

In FIG. 4 to FIG. 7 are shown representations of how the DC-Homegrid control center's DC power in provenance from the 805 source are regulated to be used at the UEI base. A representation of three voltage levels are shown: DCL-Voltage from regulator 810 for a Low-Level voltage, DCM-Voltage from regulator 820 for a Mid-Level voltage and DCH-Voltage from regulator 830 for a High-Level voltage. Those terms represent the intent of this patent to provide alternate paths for DC at the UEI base port. Such voltages can be delivered independently to their respective UEI or all can be wired to concurrently be accessed at the same port each in relation to the power cartridge installed.

Figure 4:
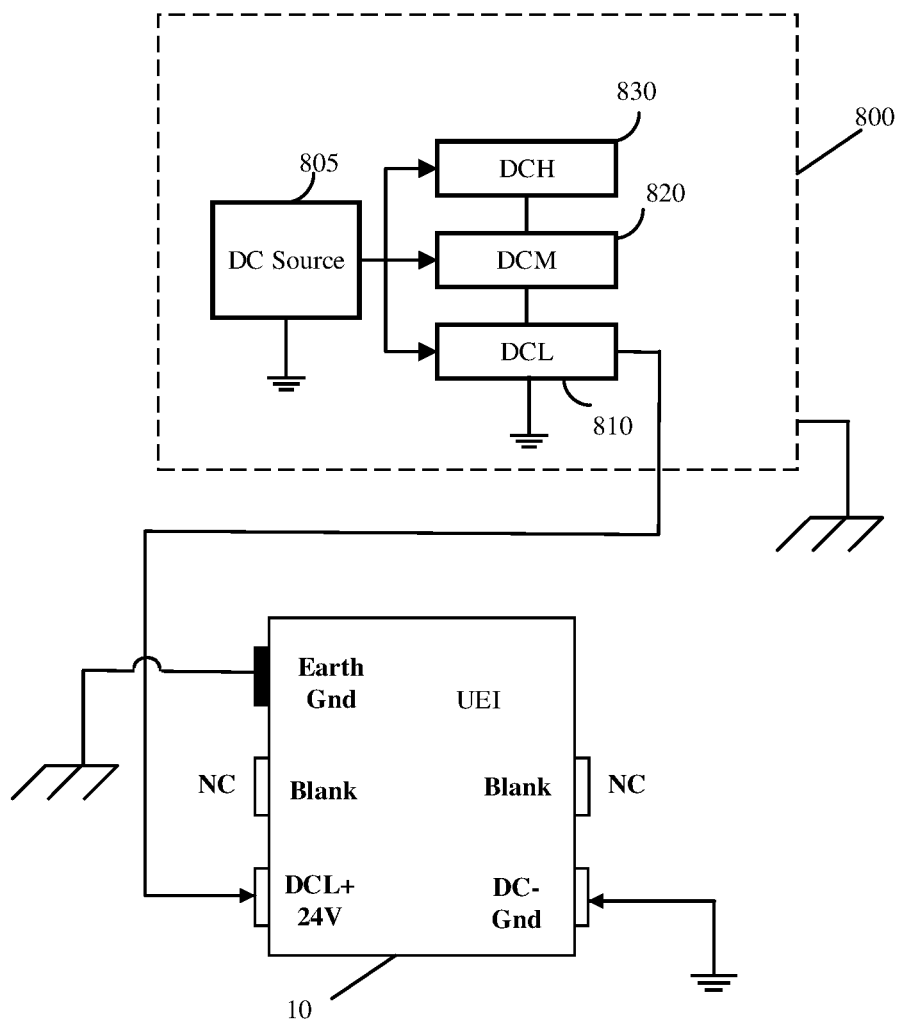
FIG. 4 shows the voltage regulation stages proposed by the DC-Homegrid working in conjunction with a UEI base platform to deliver a Low-Level DC (DCL) line to be wired to one or more UEI base.
Figure 5:
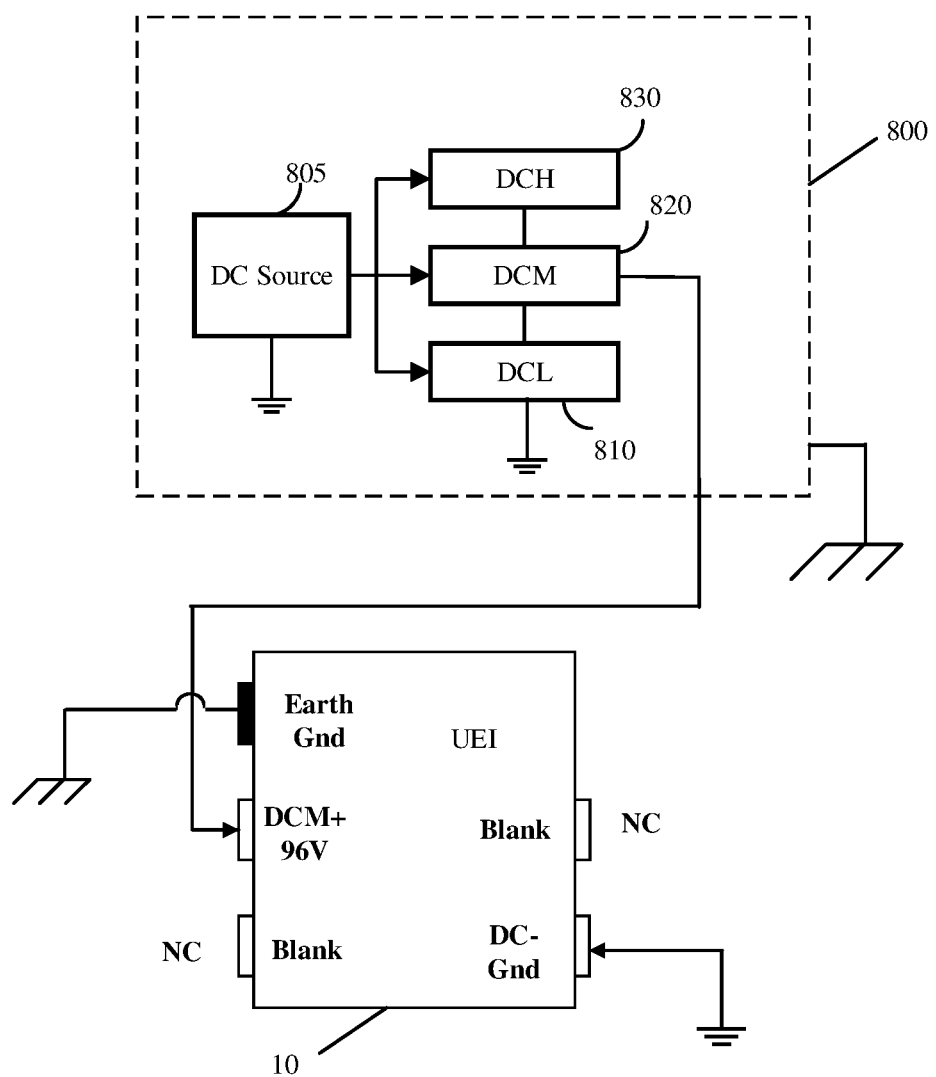
FIG. 5 shows the voltage regulation stages proposed by the DC-Homegrid working in conjunction with a UEI base platform to deliver a Mid-Level DC (DCM) line to be wired to one or more UEI base.
Figure 6:
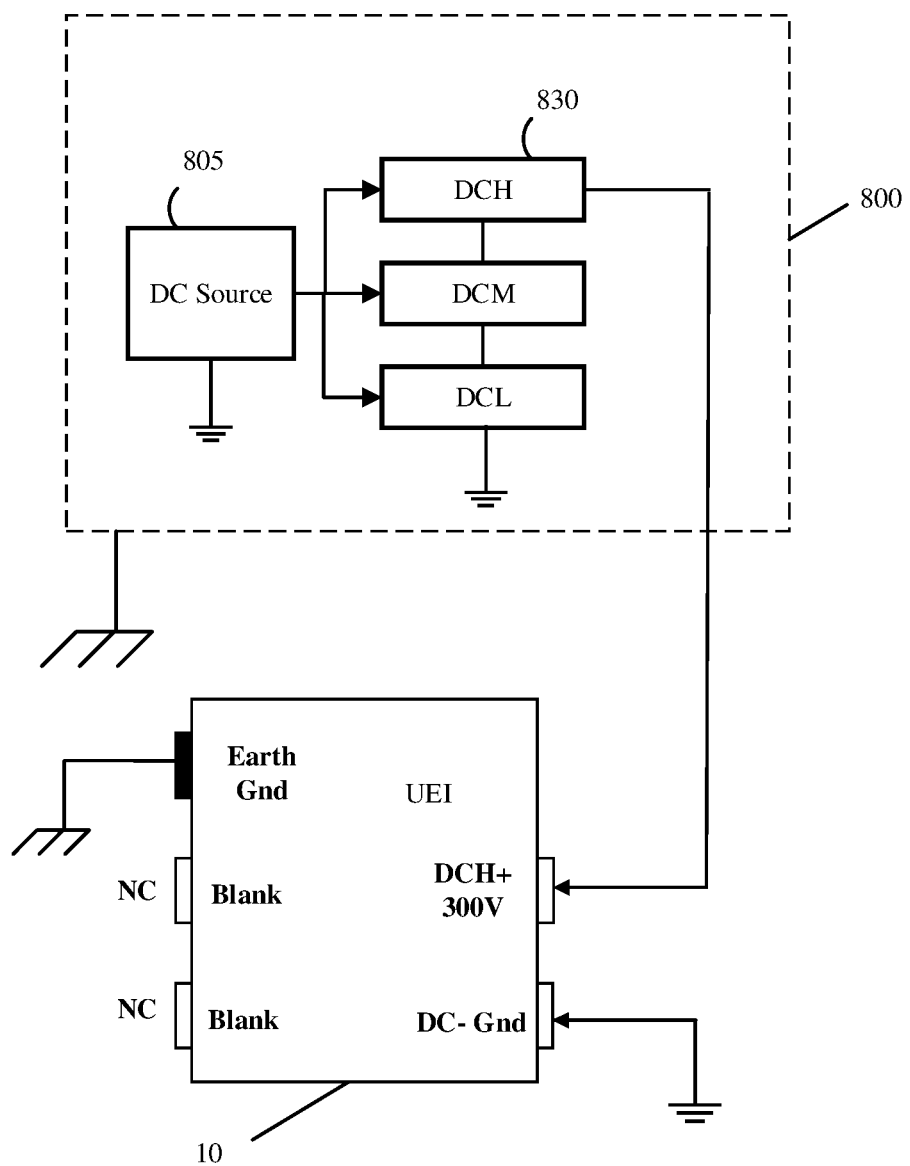
FIG. 6 shows the voltage regulation stages proposed by the DC-Homegrid working in conjunction with a UEI base platform to deliver a High-Level DC (DCH) line to be wired to one or more UEI base.
Figure 7:
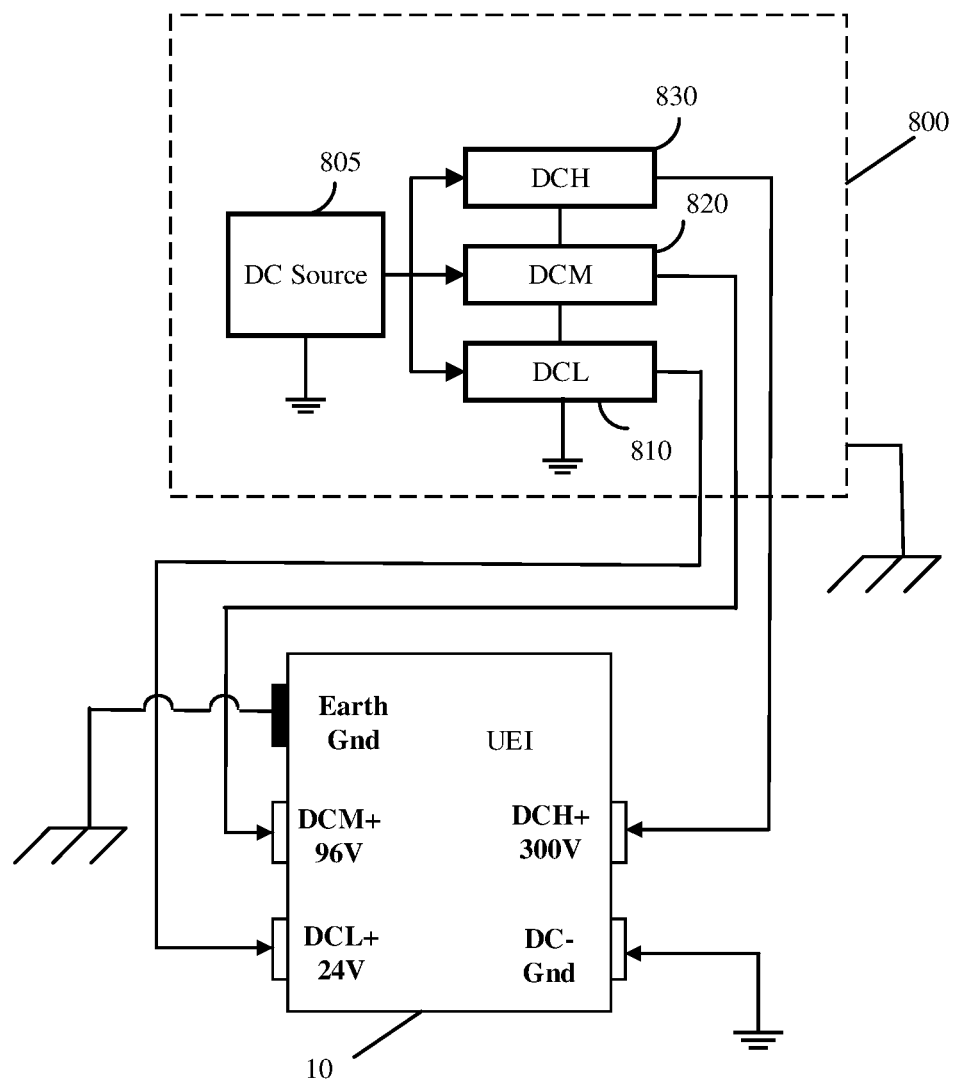
FIG. 7 is a block diagram representation of a DC-Homegrid system delivering a Low-Level DCL-Line, a Mid-Level DCM-Line and a High-Level DCH-Line. All three supply levels can be delivered concurrently into an outlet port of a building having a UEI based platform in place.

In all of the cases, DC originating from the 805 source is regulated to three different levels of Direct Connect power at the regulation stages. Those regulated outputs 810, 820 and 830 can all be sent concurrently to a single UEI base as shown in FIG. 7 or channeled independently to their respective port to be used independently as seen in FIG. 4, FIG. 5 and FIG. 6. If all of the voltage lines are wired to a single base, due to the isolation chambers at the UEI base, there will be no risks of the supplies touching each other. Only the electrical wiring and the cartridges having the correct conductive terminal hooks will make contact with their respective terminal lugs to bring out the intended voltage to the user.

Figure 8:
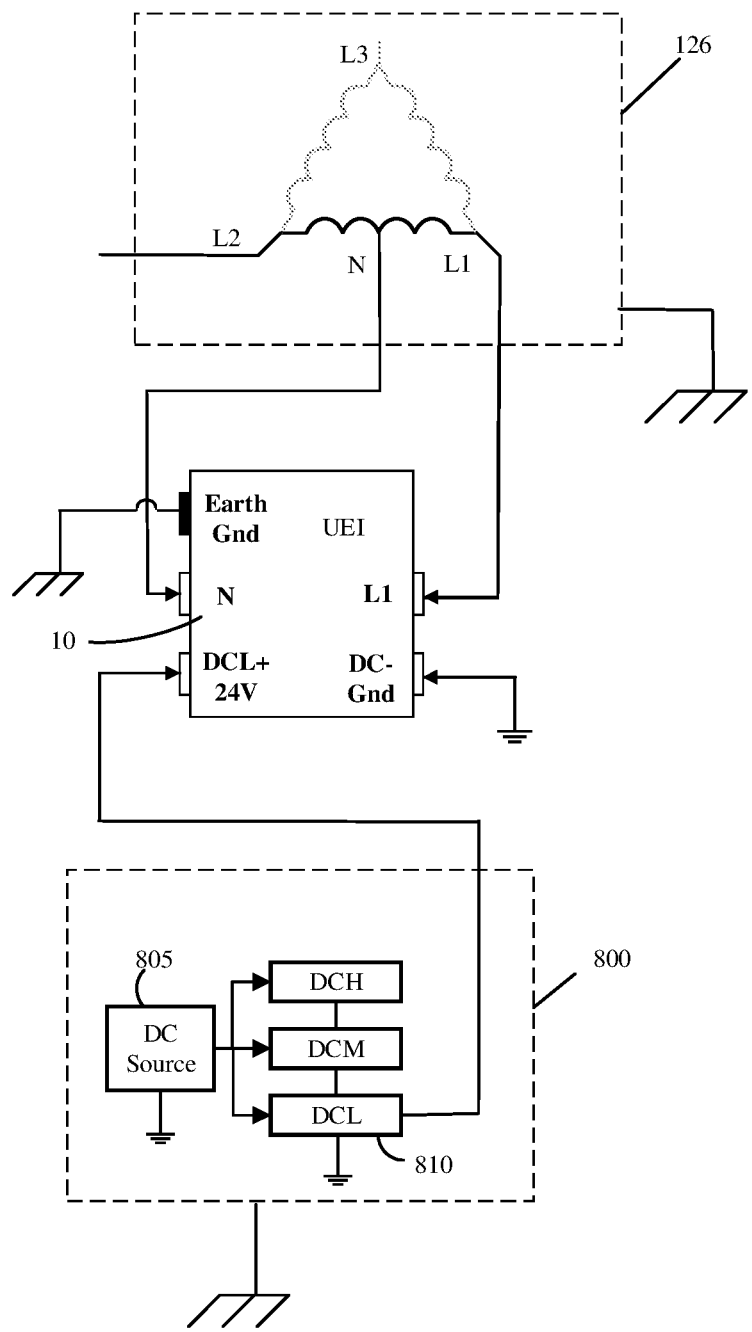
FIG. 8 is a simplified hybrid block diagram representation of a Low-Level DCL setup providing a DC-Homegrid line concurrently with a single phase 125V AC voltage into a building having a UEI based platform in place.
Figure 9:
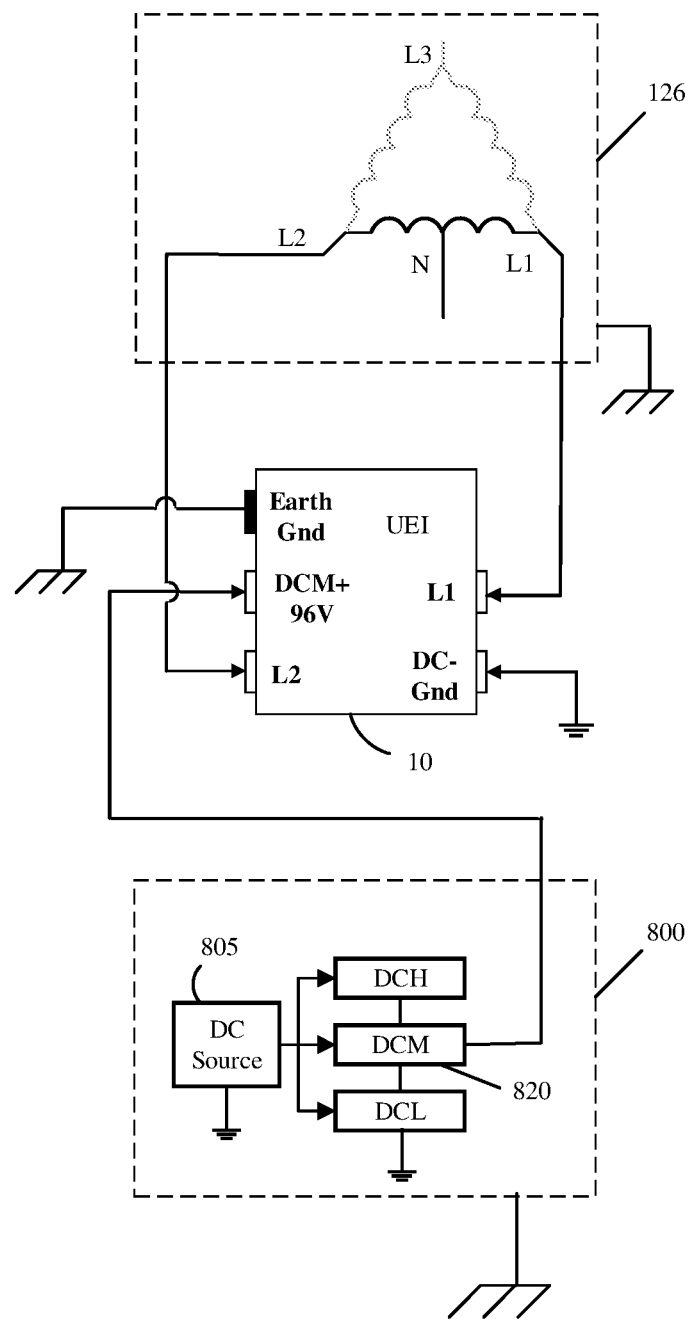
FIG. 9 is a simplified hybrid block diagram representation of a Mid-Level DCM setup providing a DC-Homegrid line concurrently with a 250V AC voltage into a building having a UEI based platform in place.

Having the ability for routing different voltage types and levels at the same time, the UEI base 10 offers the ability to be wired in a hybrid mode where both AC and DC can be sent to the same UEI base. In FIG. 8 and FIG. 9 are two different cases where two different power levels originating from the DC-Homegrid are shown to be wired in a hybrid mode. This combination allows the user to have a DCL 810 concurrently with a 125V AC, or in the second case a DCM 820 with a 250V AC. These are optional ways of bringing a hybrid voltage combination to the power consumer by way of a single port. In these hybrid configurations, either an outlet that makes available only an AC voltage or one providing only a DC voltage can be used. Also, the option to use a combination outlet providing both AC and DC can take advantage of the same UEI base, providing both options concurrently to the end power consumer. Note, however, that the DCL hybrid combination works with a single phase AC voltage and appropriate cartridges are to be used. Likewise, DCM voltage hybrid platform makes available a system AC voltage, therefore care should also be taken that the proper cartridges are used.

Figure 10:
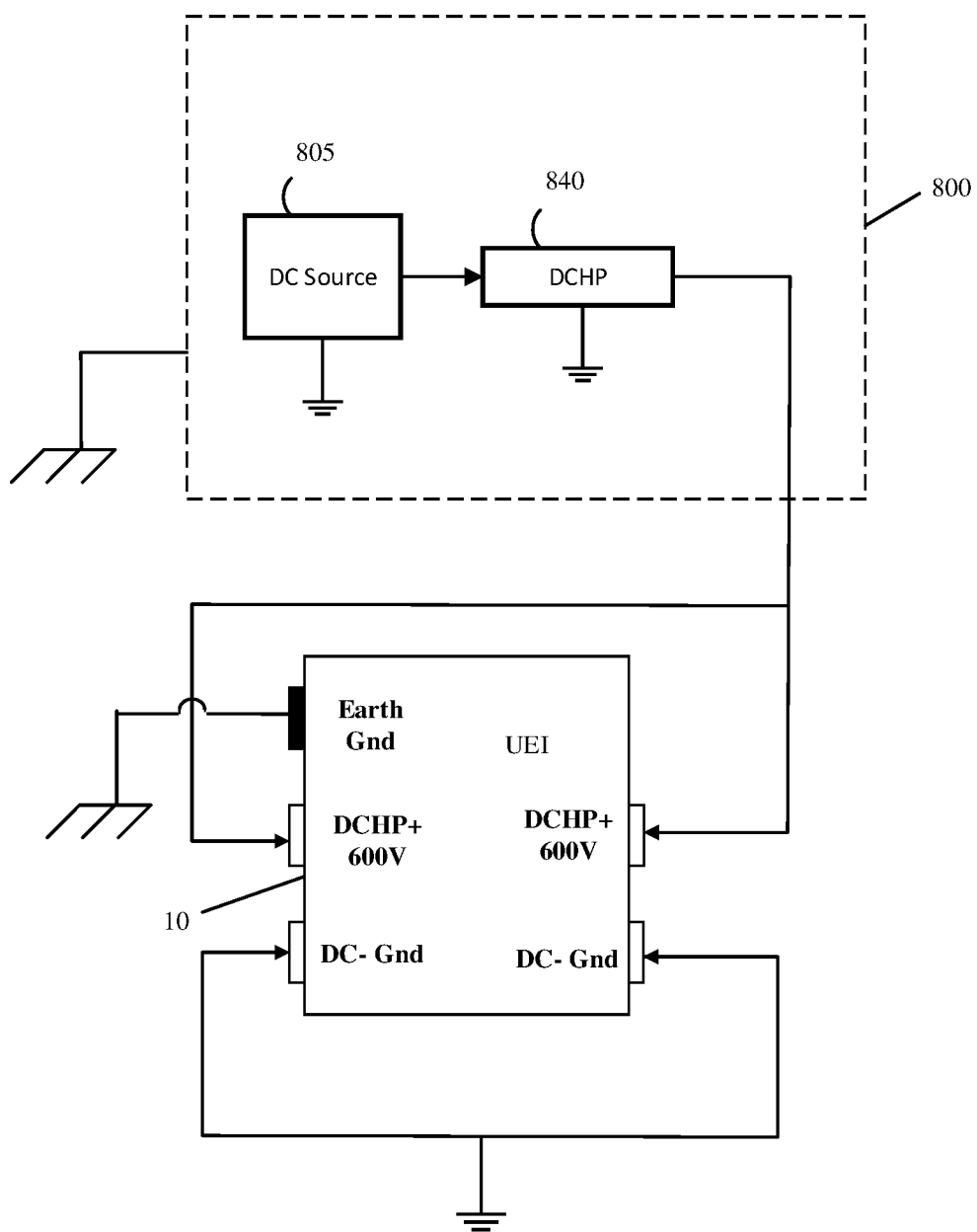
FIG. 10 shows the voltage regulation stage proposed by the DC-Homegrid working in conjunction with a UEI base platform to deliver a single High-Level/High-Power DC (DCHP) line to be wired to a special UEI base.

The UEI base can be set to accommodate a single DCH-Voltage if all that is needed at that location is to have a higher output port to drive a single high load unit. This representation can be found in FIG. 10 where the DC-Homegrid, by way of a special regulation mode 840, presents a single DCHP-Voltage option that is made available to the consumer.

Most small equipment uses a voltage level below 24V DC, and as a result, having a Homegrid DCL presented as a 24V DC represents sufficient voltage to satisfy the demand for driving most small equipment. In most cases, the level needed is only in the range of 5 to 18V DC. Then, prior to making use of the power from that low-level power port, there will be a secondary regulation step to limit the level outputted to the equipment. A Homegrid DCL line capable of providing 24V DC at a current level ranging from 20 to 25 Amperes will be sufficient to share amongst many small gears simultaneously from any given Homegrid DCL line. To protect against overloading a line, there will be, as in the AC infrastructure, a panel with circuit breakers limiting the power to be obtained from each line to not exceed, for example, 600 Watts.

In the case where higher power demand is necessary, a DCM line providing about four times the voltage can be implemented. That DCM line too can have its voltage allowance between, for example, 96 to 100V DC, about four times the value of the DCL. Following in the convention established in the AC infrastructure, a similar current limit of 15 to 20 Amperes could be established for each line to facilitate a power allowance of up to approximately 2 Kilowatts per lines.

Still for much higher power demand in a building, a DCH-Voltage line offering a voltage ranging from 300 to 500V DC can be established. From there, a much higher power allowance could be set. That regulation stage could have a current output between 30 to 50 Amperes per line. Each line can, as with the previous lower power cases, have a power limit set for that line. In that case, a 15 to 20 Kilowatts line limit would be sufficient to drive heavy load equipment requiring higher power.

Yet still for much higher power demand, as in the case of a fast charging Electric Vehicle EV port, a much larger form factor UEI base can be used allowing sufficient spacing between terminal lugs to prevent arching. From that UEI base seen in FIG. 10, two inputs from the UEI are connected to the Direct Connect positive line and two lower inputs are connected to the ground line. This arrangement provides for greater connectivity between the UEI and the cartridge. A special larger form factor charging cartridge will also be intended as a special Homegrid DCHP-Voltage port offering a voltage ranging from 400 to 600V DC. With that configuration, a higher power allowance can also be set. If that line can deliver a current output of about 300 to 400 Amperes, it can provide the needed power capable of operating a fast charging car port.

At of the time of this application, the infrastructure in place curtails only for the AC; a method for DC delivery in a building is not yet defined. As a result, this proposed Direct Connect Homegrid 800, as was shown, offers the versatility to have the option of using both AC and DC in a building. That option can be used concurrently or as desired by the end power user, each could be used independently. In order to take advantage of the UEI platform, components allowing the delivery of DC in a building are also needed.

With the standard not yet established for DC connectivity in a building, the proposed DC-Homegrid system of this patent proposes a method of keeping a building powered in the event of a natural disaster or other failure due to accidents or intentional attack on the power grid. This assumes that a building is connected to the power grid and wants to take full advantage of its maximum potential by having a UEI/DC-Homegrid home based system of power generation and distribution 700 in conjunction with being connected to the AC grid. To take advantage of this proposed DC-Homegrid, it is thus necessary to build an infrastructure to take advantage of connecting directly to DC in the home and keep the lights on when the consumer would otherwise have been in the dark in case of a grid failure.

To accomplish this safely, out of the meter/monitor 708, of FIG. 1, it is shown that the power in the AC grid is monitored with a feed coming directly from the entry point of the AC line into a building. If AC power is found not to be present, the internal circuit in the monitor would prevent DC from being sent to the inverter. The reason for that measure is to prevent electrical power generated by the DC-Homegrid from being fed back into the AC line and becoming a hazard for crew members performing repair.

That same protection measure is the reason why, in this patent, exclusive use of the generated power by the Direct Connect Homegrid system is in the DC format. If the power from the generation system or storage system was to be sent as AC, it would have to be delivered by way of the AC infrastructure currently in use. Doing so would defeat the measure taken to protect from back feeding the power grid. As a result, coming from the battery storage in this instance where the building is tied to the power grid, no power is sent to the inverter.

Same as in the AC power case, for protective measure, an earth grounding option is provided with the DC-Homegrid system. The purpose of this serves to create a barrier in case there happens to be a DC ground return line failure. With that option in place it becomes easy to implement a fault protection feature either in a cartridge or outlet base, at the distribution box or even in line with the plug connecting equipment to the DC-Homegrid.

Figure 2:
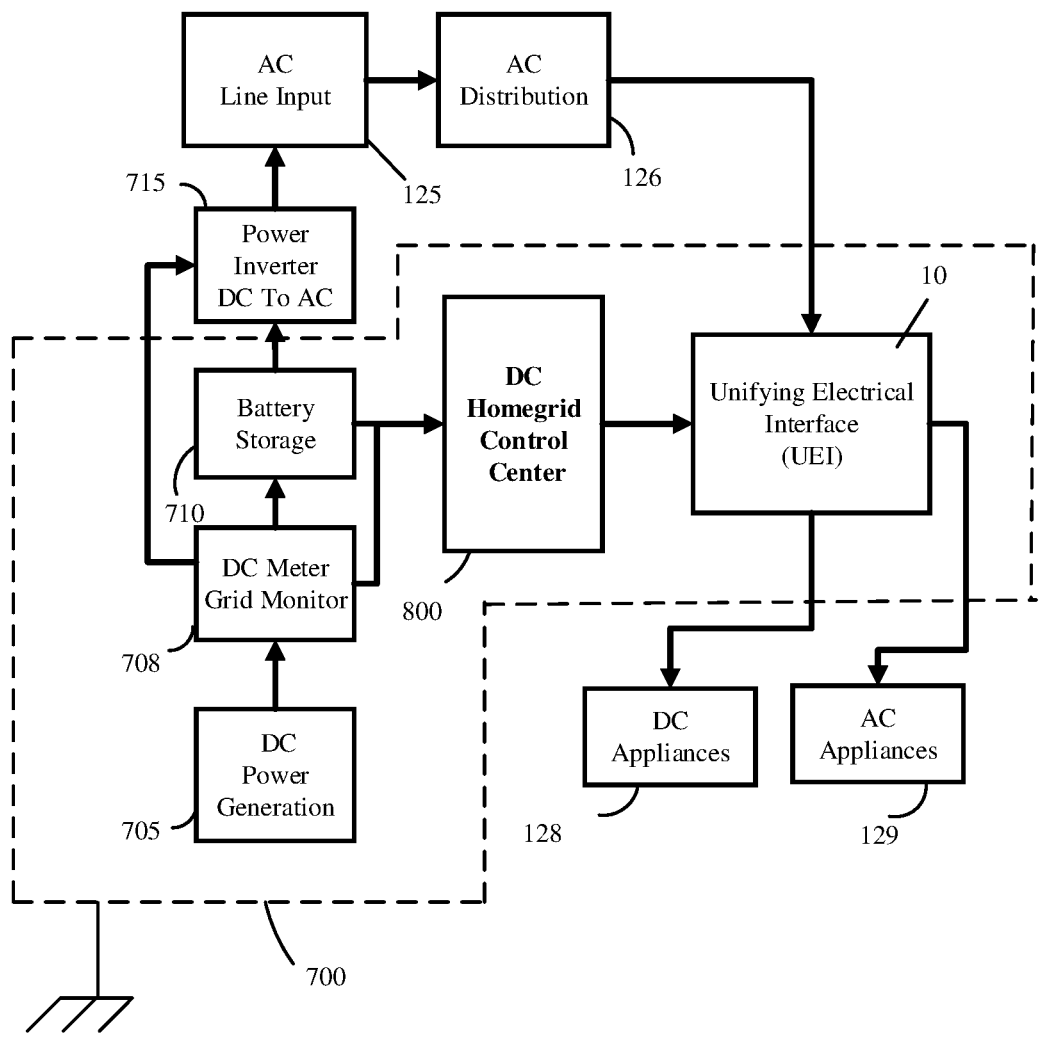
FIG. 2 is a block diagram representation of the Direct Connect Homegrid system as used in the case where the building is independent from the AC power grid and both AC and DC are derived from the power generation system.

An alternate embodiment of the implementation of the DC-Homegrid involves a building not connected to the AC power grid, either situated in a remote location or simply done by choice. In this case, there is the option to convert a portion of the DC power generation into AC by bypassing the monitor mode intended at blocking DC from going to the inverter in the event of an AC grid power failure. Alternatively, stored DC can then be connected to the inverter for the purpose of generating the needed AC for the building. This embodiment is mentioned in FIG. 2 of this application. It remains, however, that loss associated with the inversion process are to be incurred. Due to the more widespread use of AC into a building, the result will be that the storage will last for a shorter amount of time in this instance. For that reason, it would be recommended to have a larger capacity storage battery that can last for many days in the event that the power generation method is obstructed, as could be the case in a Solar Panel system in a snowy region.

Figure 3:
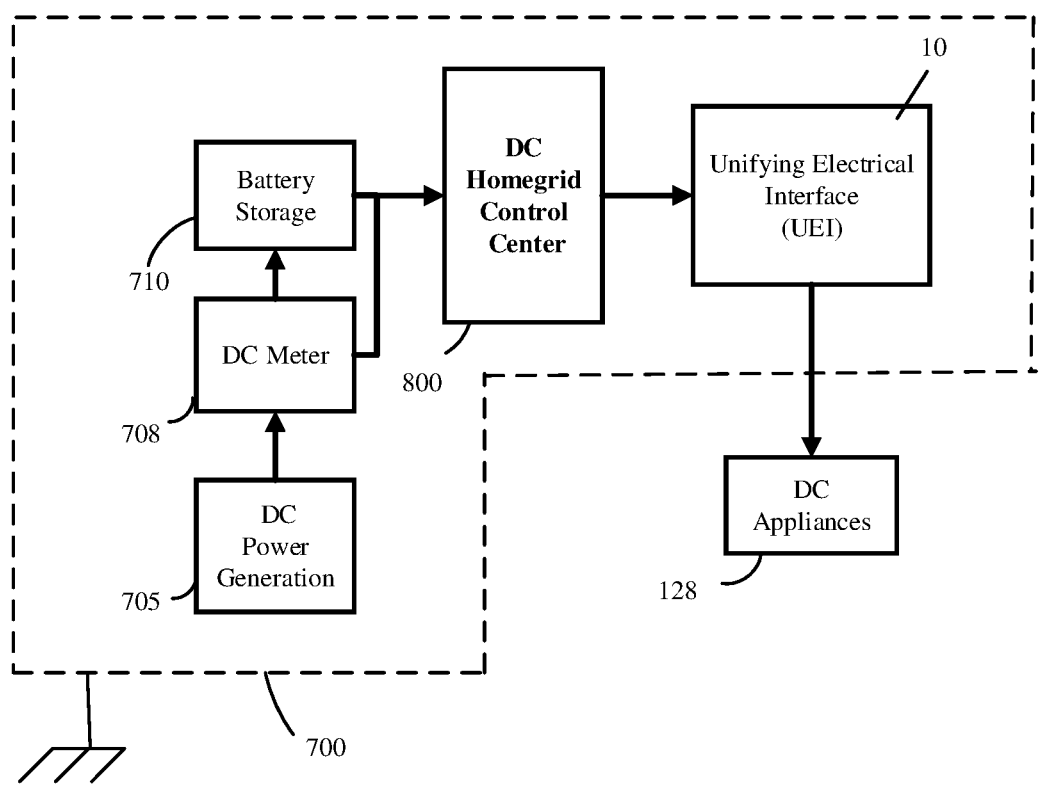
FIG. 3 is another block diagram representing the Direct Connect Homegrid system where the power generated is fed into a building as DC only. This is a representation of a DC only home.

Yet another embodiment found in FIG. 3 calls for a DC only powered building. That option only uses the Direct Connect Homegrid as the avenue for processing DC power to the building. As a building not tied to the AC grid, it would also be recommended to have larger capacity storage units.

As a means of distributing power from the DC-Homegrid of this patent, we proposed a UEI base to take advantage of the multi-paths it provides to enjoy the full benefits of this proposed DC-Homegrid, as is shown in the various modes illustrated. It remains, however, that other avenues of distribution can still be employed to use power from the DC-Homegrid. Such can include a mocked usage of outlets and wiring intended for the AC infrastructure, or simply developing a non-UEI based approach for taking advantage of this system.

Figure 11:
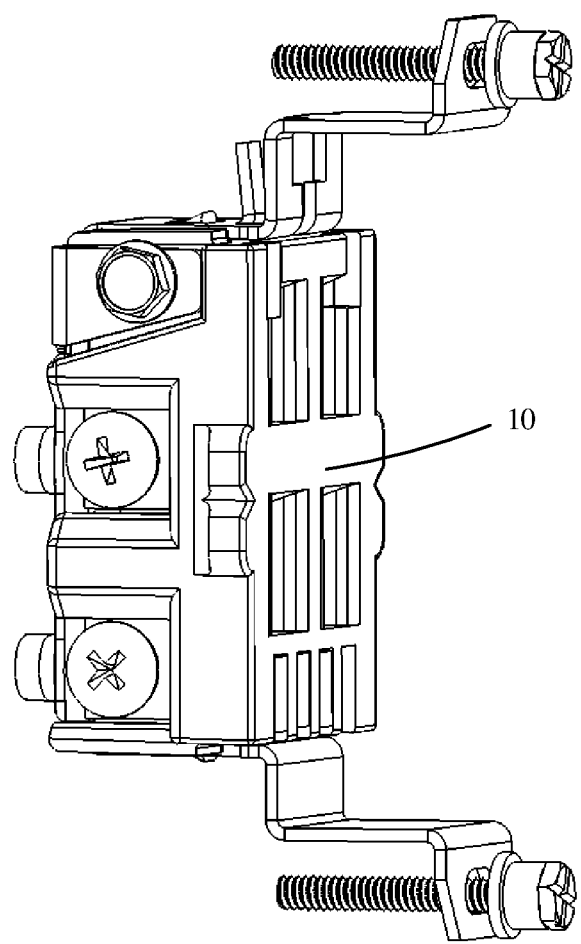
FIG. 11 is a representation of the UEI base platform used in the DC-Homegrid system for power delivery to cartridges intended as outlets or for switching to various loads.

The preferred mode of distributing power from the DC-Homegrid has been demonstrated to be by means of the UEI base platform. FIG. 11 shows this platform presented in the form of a receptacle. The UEI serves as an intermediate power delivery unit forming a distribution platform configured to connect a plurality of power sources and to provide a range of AC and DC voltages. That UEI is also adaptable to receive a variety of outlets and switches as can be found worldwide. It is adaptable to receive future development for the infrastructure of tomorrow. As a result, it needs to be protected from being cross-inserted with the wrong cartridge.

A cross-insertion key feature has been developed and presented in the referenced patent for the UEI, but due to further development, included in this application is a more expounded table detailing many more key matrix options for the platform. The table in FIG. 12 serves to demonstrate the many more configurations between cartridges and the UEI base that can take advantage of this Direct Connect Homegrid system.

The practice made of the Direct Connect Homegrid system for DC power distribution presented in this patent is one of the many ways that the Unifying Electrical Interface Platform can be adapted to be used. Together, the DC-Homegrid and the UEI form elements of a DC infrastructure to be used in homes, industrial and commercial environments. There exists many more ways of making use of this system, either by using each element individually or as a combination thereof that may be derived from this patent and are not represented in this application. Anyone skilled in the art may easily discern these and/or other aspects not described herein that, in effect, remain and constitute the intent of this patent.

The invention claimed is:

1. A Direct Connect Homegrid system or DC-Homegrid for Direct Current (DC) power distribution comprising:
   a local DC system for power generation to produce and distribute electricity for use in a building, structure, boat, RV, any vehicle or mode of transportation either private or public or any dwelling having the DC-Homegrid system where electricity is used;
   a DC metering and monitoring system to measure power outputted by the local DC system for power generation, to monitor power from the AC grid and to channel electricity to various points of use in the DC-Homegrid system;
   a battery storage unit or an array of batteries for energy storage or any mode of high capacity energy storage for future use in the DC-Homegrid system;
   a DC-Homegrid control center to select DC sources, to regulate voltage outputs, to set line load limits and to distribute various DC levels to their appropriate destination;
   a network of Unifying Electrical Interface platforms or UEI bases for AC and DC power control and connectivity.

2. The local DC system for power generation of claim 1, wherein the method for power generation used is a photovoltaic based system, or a fuel cell micro power-plant, or a geothermal farm, or any renewable and sustainable form of DC electricity power generation to the DC-Homegrid system.

3. The local DC system for power generation of claim 1, wherein for the purpose of safety, the system is end-to-end connected to earth ground, allowing to include a ground fault protection feature with the DC-Homegrid system.

4. The DC metering and monitoring system of claim 1, wherein a meter and a controller are used to monitor and compute the amount of electricity generated and processed by said local DC system for power generation.

5. The DC metering and monitoring system of claim 1, wherein out from the meter DC is routed to different paths for different purposes, is sent to the battery storage unit if present, is fed to an inverter unit and directly connecting power to said DC-Homegrid Control Center.

6. The DC metering and monitoring system of claim 1, wherein as a method for power isolation, AC voltage from the power grid is monitored and wherein in the absence of such, a sense circuit triggers an isolation of DC power in provenance from the local DC system for power generation and prevents DC from being sent to the inverter unit to avoid feeding the AC grid in a blackout situation.

7. The DC metering and monitoring system of claim 1, wherein by reason of its power isolation method in place, the DC system for power generation remains active when the power grid is not operational and an alternate or renewable power generation system is available and ready for electricity production.

8. The battery storage unit of claim 1, wherein the battery use in the DC-Homegrid system is a locally situated large capacity unit of either a deep cycle Lithium Ion, Lead Acid, Nickel Metal Hydride Ni-MH or any such similar high capacity rechargeable battery storage system.

9. The battery storage unit of claim 1, wherein in the case of an AC grid connected system, battery stored energy is used exclusively through the DC-Homegrid system and is further isolated from feeding DC into the inverter to inhibit AC power from being generated from stored DC.

10. The DC-Homegrid control center of claim 1, wherein DC source selection is given priority to stored and/or generated sources entering the DC-Homegrid system, and wherein in the absence of such sources the Homegrid control center switches to a central AC driven power supply for DC power generation to maintain a single point of DC source to a building or structure.

11. The DC-Homegrid control center of claim 1, wherein by way of a regulation stage, a DCL-Voltage source is established to drive a series of low-level voltage lines of approximately 24V DC each line.

12. The DC-Homegrid control center of claim 1, wherein by way of a regulation stage, a DCM-Voltage source is established to drive a series of mid-level voltage lines of approximately 96V DC each line.

13. The DC-Homegrid control center of claim 1, wherein by way of a regulation stage, a moderately high DCH-Voltage source is established to drive a series of moderately high-level voltage lines of approximately 300V DC each line.

14. The DC-Homegrid control center of claim 1, wherein by way of a regulation stage, a high power DCHP-Voltage source is established to deliver a high-level voltage line of approximately 500 to 600V DC.

15. The network of Unifying Electrical Interface of claim 1, wherein the DCL-Voltage, the DCM-Voltage and the moderately high DCH-Voltage sources are all three wired to UEI bases to make available three separate DC voltage levels concurrently to a single connection port.

16. The network of Unifying Electrical Interface of claim 1, wherein the DCL-Voltage is wired to one or more UEI base ports to provide a single voltage line of approximately 24V DC to one or more UEI connection ports concurrently.

17. The network of Unifying Electrical Interface of claim 1, wherein the DCM-Voltage is wired to one or more UEI base ports to provide a single voltage of approximately 96V DC to a one or more UEI connection ports concurrently.

18. The network of Unifying Electrical Interface of claim 1, wherein the moderately high DCH-Voltage line is wired to one or more UEI base ports to provide a single voltage of approximately 300V DC to one or more connection ports concurrently.

19. The network of Unifying Electrical Interface of claim 1, wherein the DCHP-Voltage, is wired to a UEI base port to provide a high voltage DC of approximately 500V or more at high power to a connection port.

20. The network of Unifying Electrical Interface of claim 1, wherein the DCL-Voltage of approximately 24V DC from the DC-Homegrid control center and a phase AC voltage of approximately 125V are wired in parallel to one or more UEI base ports to power a series of Low-Hybrid UEI interface ports each made of an AC and a DC voltage delivered concurrently to one or more UEI connection ports.

21. The network of Unifying Electrical Interface of claim 1, wherein the DCM-Voltage of approximately 96V DC from the DC-Homegrid control center and a System AC voltage of approximately 250V are wired in parallel to one or more UEI base to provide a series of Mid-Hybrid UEI interface ports made of an AC and a DC voltage delivered concurrently to one or more UEI connection ports.

22. The Low-Hybrid UEI interface ports of claim 20, wherein the voltage obtained at any UEI base depends on the cartridge used, either a 125V AC cartridge, or a DCL-Cartridge or a combination thereof.

23. The Mid-Hybrid UEI interface ports of claim 21, wherein the voltage obtained at any UEI base depends on the cartridge used, either a 250V AC cartridge, or a DCM-Cartridge or a combination thereof.

\* \* \* \* \*